(12) United States Patent
Waldman et al.

(10) Patent No.: US 10,004,341 B2
(45) Date of Patent: Jun. 26, 2018

(54) CONVERTIBLE HIGHCHAIR AND INFANT CARRIER STAND DEVICE

(71) Applicant: Phoenix Baby LLC, Plymouth Meeting, PA (US)

(72) Inventors: Kenneth Craig Waldman, Gladwyne, PA (US); Owen Chen, Taipei (TW); Gary Cheng, Taichung (TW)

(73) Assignee: Phoenix Baby LLC, Plymouth Meeting, PA (US)

( * ) Notice: Subject to any disclaimer, the term of this patent is extended or adjusted under 35 U.S.C. 154(b) by 2 days.

(21) Appl. No.: 15/069,299

(22) Filed: Mar. 14, 2016

(65) Prior Publication Data
US 2017/0258244 A1    Sep. 14, 2017

(51) Int. Cl.
*A47D 1/02*    (2006.01)
*A47D 13/02*   (2006.01)
*B60N 2/28*    (2006.01)
*A47D 1/00*    (2006.01)
*A47D 15/00*   (2006.01)

(52) U.S. Cl.
CPC .............. *A47D 1/006* (2013.01); *A47D 1/02* (2013.01); *A47D 13/02* (2013.01); *A47D 15/006* (2013.01); *B60N 2/2848* (2013.01)

(58) Field of Classification Search
CPC .......... A47D 1/006; A47D 1/02; A47D 1/002; A47D 13/025; A47C 4/286; B60N 2/2842; B60N 2/2845; B60N 2/2848
USPC ....................................................... 297/487
See application file for complete search history.

(56) References Cited

U.S. PATENT DOCUMENTS

| 3,004,793 | A | * | 10/1961 | Loomis | A47D 1/00 297/274 |
| 5,375,869 | A | * | 12/1994 | Hsiao | A47D 1/02 280/31 |
| 5,772,279 | A | * | 6/1998 | Johnson, Jr. | B60N 2/2821 280/30 |
| 5,951,102 | A | * | 9/1999 | Poulson | A47D 1/004 297/130 |
| 6,659,544 | B2 | | 12/2003 | Hollett et al. | |
| 7,281,759 | B1 | * | 10/2007 | Strong | A47D 1/02 297/135 |

(Continued)

OTHER PUBLICATIONS https://www.amazon.com/Hollett-Dual-Mate-Travel-Highchair-Carrier/dp/B009DQHJ2E downloaded on Jan. 19, 2017, 4 pages.

(Continued)

*Primary Examiner* — Timothy J Brindley
(74) *Attorney, Agent, or Firm* — Caesar Rivise, PC

(57) ABSTRACT

A collapsible convertible highchair and infant carrier stand device is provided. It includes basket and a base supporting the basket. The basket is configured to receive an infant carrier or to directly support a seated infant. The basket includes a bottom wall, a first end wall, a pair of sidewalls, a second end wall, a crotch panel and a back support panel. The crotch panel and the back support panel are located in the basket between the first and second end walls. Each is configured to be pivoted from a stowed position, when the device is holding an infant carrier, to an operative position when the device is directly supporting the infant. In the operative position the infant's back will rest against the back support panel and his/her legs will extend through opening in the crotch panel and a window in the first end wall.

18 Claims, 6 Drawing Sheets

(56) References Cited

U.S. PATENT DOCUMENTS

| | | | | |
|---|---|---|---|---|
| 7,461,891 | B1* | 12/2008 | Andersen | A47D 1/02 297/16.1 |
| 9,629,476 | B1* | 4/2017 | Robbins | A47D 9/02 |
| 2002/0117520 | A1* | 8/2002 | Chen | A47D 13/02 224/158 |
| 2004/0239165 | A1* | 12/2004 | Levin | A47D 15/006 297/250.1 |
| 2008/0036256 | A1* | 2/2008 | Gold | A47D 1/02 297/255 |
| 2011/0148159 | A1* | 6/2011 | Barron | A47D 1/02 297/219.12 |
| 2014/0101859 | A1* | 4/2014 | Testa | A47D 1/10 5/655 |
| 2014/0252737 | A1* | 9/2014 | Maxie | A47D 13/025 280/47.38 |
| 2015/0082539 | A1* | 3/2015 | Lin | A47D 1/002 5/105 |
| 2016/0016602 | A1* | 1/2016 | D'Anastasi | B62B 9/22 297/260.2 |
| 2016/0192787 | A1* | 7/2016 | Perrin | A47D 1/006 297/16.1 |
| 2016/0242565 | A1* | 8/2016 | Van den Akker | A47D 15/006 |

OTHER PUBLICATIONS

Brochure for the GoTo 2 in 1 Infant Car Seat Station and Hi Chair Stand, Model #GT201, PRN: AIM-GT201-PNX [Feb. 20, 2015], 10 pages.

* cited by examiner

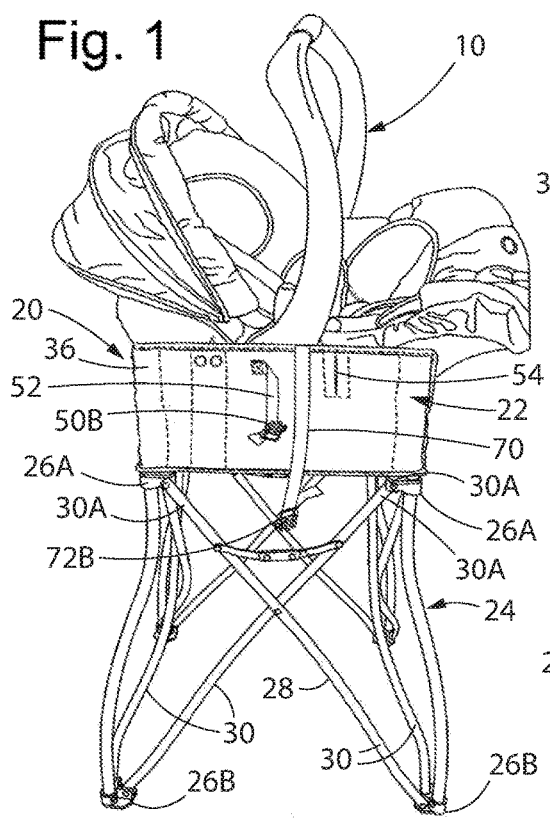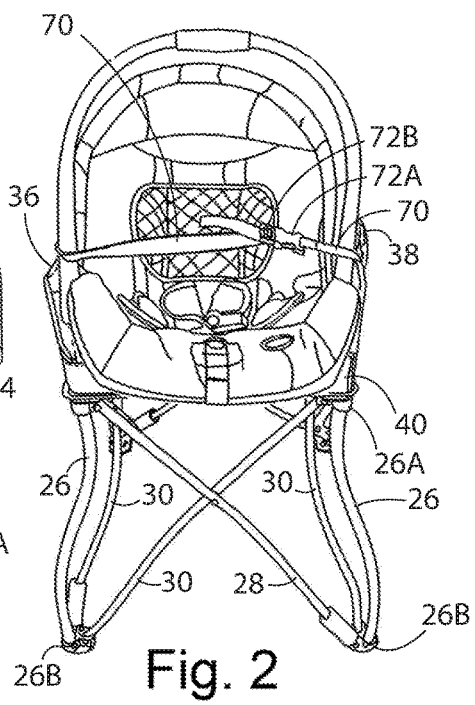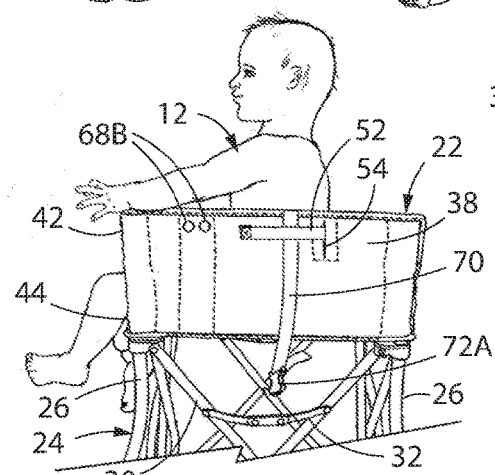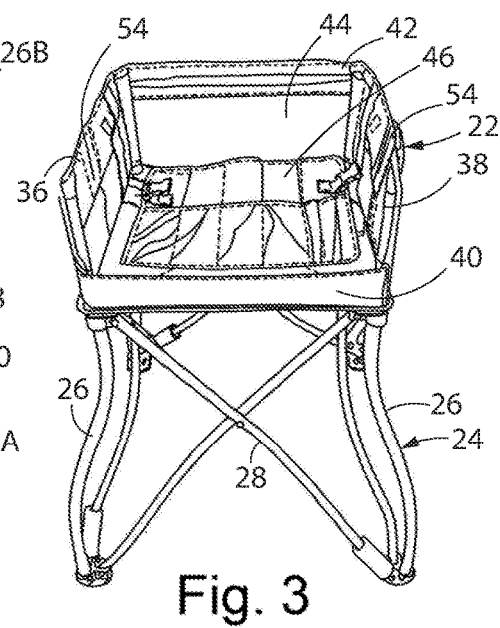

CONVERTIBLE HIGHCHAIR AND INFANT CARRIER STAND DEVICE

FIELD OF THE INVENTION

This invention relates generally to high chairs for infants and more particularly to collapsible high chair devices for infants that can be readily converted to a stand for supporting an infant carrier therein, and vice versa.

BACKGROUND OF THE INVENTION

In U.S. Pat. No. 6,659,544 (Hollett et al.) there is disclosed a reconfigurable chair for home or restaurant use for supporting a toddler or small child in a sitting position or an infant in an infant carrier. The reconfigurable chair has a fixed frame formed of wood or other lightweight material, such as plastic, providing a base for placement on a floor surface. The frame has a front side, a back side, and two opposing sides. A seat assembly is supported on the frame at a position elevated above the base. The seat assembly has a bottom seat fixedly secured to the frame and a movable back rest pivotally joined to the bottom seat. The movable back rest is operable between an upright seat position, in which a toddler or small child can sit on the bottom seat and have his/her back against the back rest, and a closed position, in which the back rest is folded down on the bottom seat. The chair also has a front cross member on the front side of the chair extending between the opposite left and right sides of the frame and positioned on the frame above the bottom seat and a back cross member in the back side of the frame extending between the left and right side of the frame positioned on the frame between the levels of the back cross member and the bottom seat and wherein the front and back cross members are positioned relative to one another and adapted to receive an infant carrier facing toward the back of the frame when the movable seat back rest is folded down.

While the chair of the '544 patent appears generally suitable for its intended purposes, it leaves much to be desired from various standpoints, such as its inability to be use as a portable unit, since it is incapable of being collapsed for easy storage or transportation.

A collapsible infant car seat station and highchair stand has been sold under the trademark The GoTo™. That device addresses some of the drawbacks of the device of Hollett et al. patent, but nevertheless leaves much to be desired from various standpoints, the most significant of which being the resistance to tipping-over when the device is configured as a high chair and when an infant is seated in the high chair. The subject invention addresses those drawbacks All references cited and/or identified herein are specifically incorporated by reference herein.

SUMMARY OF THE INVENTION

In accordance with one aspect of this invention a convertible highchair and infant carrier stand device is provided. The device comprises a basket and a base. The basket comprises a bottom wall, a first end wall, a pair of sidewalls, and a second end wall. Each of the walls comprises a flexible material. The first wall is of a lesser height than the sidewalls. The basket section is configurable to receive an infant carrier which has a front and a rear, wherein the front of the infant carrier is disposed immediately adjacent the first end wall and the rear of the infant carrier is disposed immediately adjacent the second end wall. The second end wall has a window located closely adjacent the bottom wall. The basket section also is configurable to hold a seated infant therein and additionally comprises a back support panel and a crotch panel. The back support panel is connected to the bottom wall between the first end wall and the second end wall. The back support panel is configured to be moved from a storage position to an operative position, and vice versa. The back support panel, when in the storage position, is generally parallel to the bottom wall and when in the operative position extends upward from the bottom wall. The back support panel has a pair of edge portions configured for releasable securement to respective ones of the sidewalls to hold the back support panel in the operative position to engage the back of an infant seated on the bottom wall in the basket. The crotch panel is a flexible member having a pair of side edge portions and a pair of leg openings and is secured to the bottom wall between the back support panel and the second end wall. The crotch panel is configured to be moved from a storage position to an operative position, and vice versa. The crotch panel, when in the storage position, is generally parallel to the bottom wall. The crotch panel, when in the operative position, extends upward from the bottom wall. The crotch panel is configured for releasable securement to the sidewalls to hold the crotch panel in the operative position, wherein the leg openings are oriented to receive respective legs of an infant seated on the bottom wall in the basket section with the legs of the infant extending through the window so that the infant is generally centered in said basket.

In accordance with one preferred aspect of this invention the base comprises plural legs coupled to the basket. The legs are configured to be pivoted with respect to one another from an outwardly splayed orientation to an inwardly compact position, and vice versa.

In accordance with another preferred aspect of this invention each of the walls of the basket section is configured to be collapsed when the legs are in the inwardly compact position.

In accordance with another preferred aspect of this invention each of the edge portions of the crotch panel comprises a first connector, e.g., a VELCRO® connector, and wherein each of the side walls comprises a second connector, e.g., a VELCRO® connector. The first connector of a first one of the edge portions of the crotch panel is configured for releasable securement to the second connector of a first one of the sidewalls. The first connector of a second one of the edge portions of the crotch panel is configured for releasable securement to the second connector of a second one of the sidewalls.

In accordance with another preferred aspect of this invention each of the sidewalls of the basket has an outer surface, and wherein the back support panel comprises a pair of flexible straps extending therefrom. Each of the flexible straps of the back support panel has a buckle or clasp component secured thereon. Each of those straps is configured to be extended through an associated sidewall of the basket for releasable securement to a buckle or clasp component secured to said outer surface of the sidewall to hold the back support panel in the operative position.

In accordance with another preferred aspect of this invention the device additionally comprises a strap for releasably securing the infant carrier to the basket section.

In accordance with another preferred aspect of this invention the device additionally comprises a harness secured to the basket to hold a seated infant in the basket.

DESCRIPTION OF THE DRAWING

FIG. 1 is a side perspective view of one exemplary embodiment of a convertible high chair and infant carrier stand device constructed in accordance with this invention, the device including a collapsible base and a collapsible basket, with the basket shown holding a conventional infant carrier therein;

FIG. 2 is a side perspective view of the device of FIG. 1, shown with the infant secured in place by a pair of straps forming a portion of the device;

FIG. 3 is a front perspective view of the device of FIG. 1 configured for receipt of the infant carrier;

FIG. 4 is a side perspective view of the device shown in FIG. 1, but with the device configured to act as a highchair, wherein the basket of the device is shown holding a seated infant therein;

DETAILED DESCRIPTION OF THE PREFERRED EMBODIMENTS

Figure 5:
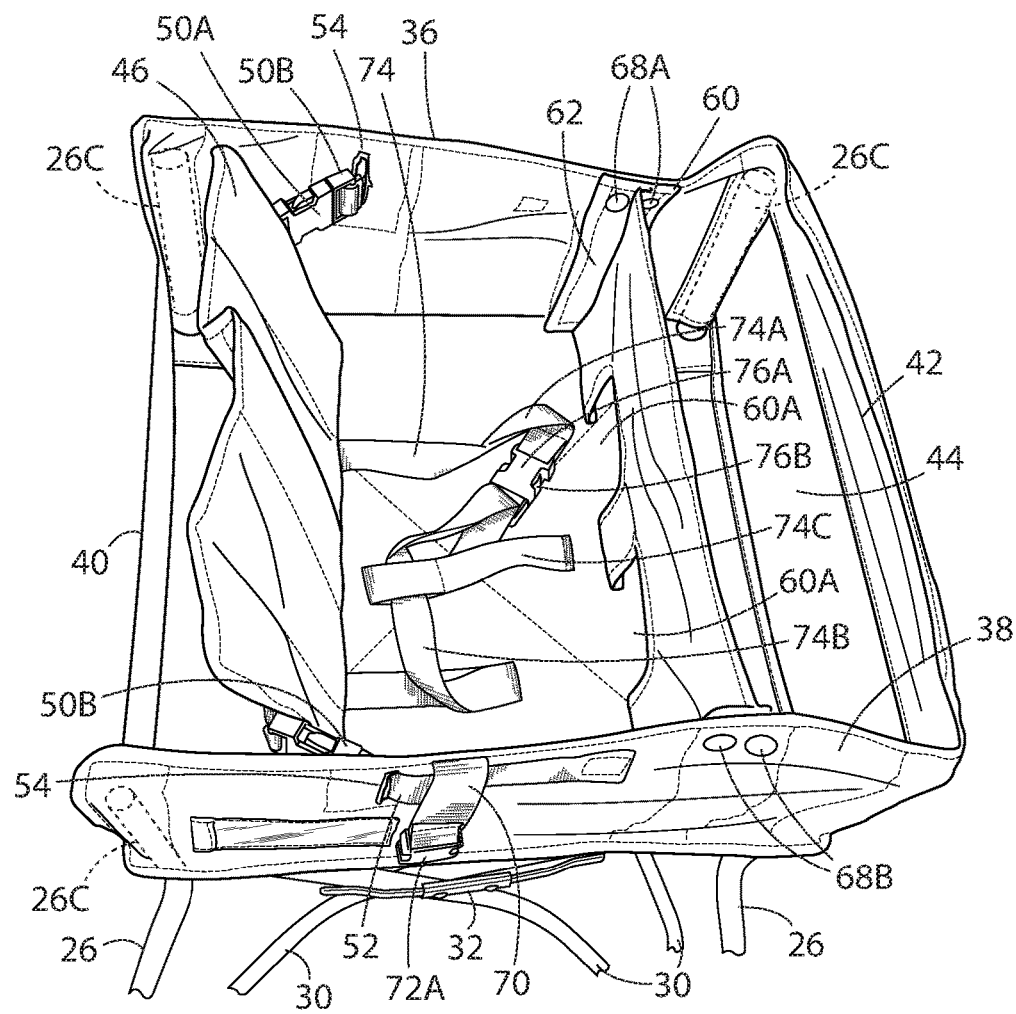
FIG. 5 is an enlarged side perspective view of a portion of the device of FIG. 1 with the basket configured as a high chair for an infant.

Referring now to the various figures of the drawing wherein like reference characters refer to like parts, there is shown in FIG. 1 one exemplary embodiment of a convertible highchair and infant carrier stand device 20 constructed in accordance with this invention. The device 20 basically comprises a basket 22 and a base 24. The details of the basket will be described in detail later. Suffice it for now to state that the basket 22 is a collapsible member which when the device 20 is opened to its expanded state, serves to support a conventional infant carrier 10, like shown in FIGS. 1 and 2, in the basket, or to directly support an infant 12 seated in the basket, like shown in FIG. 4.

Figure 9:
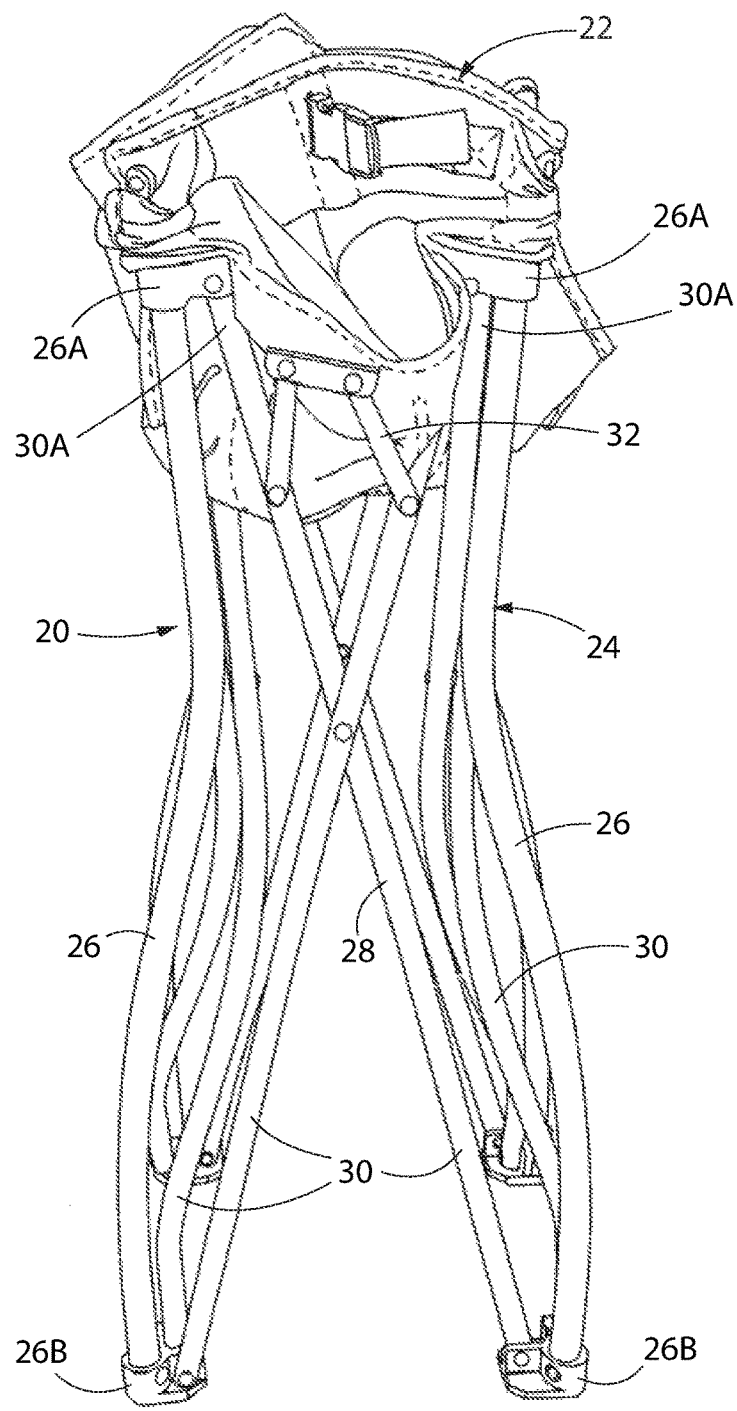
FIG. 9 is an isometric view of the device of FIG. 1 shown in its fully collapsed state.

The base 24 is in the form of a collapsible frame comprising four elongated, slightly S-shaped legs 26 and four elongated cross braces 28. The legs and cross braces are each formed of a light-weight and strong material, e.g., aluminum. Each cross brace 28 comprises a pair or struts 30 pivotably connected together at an intermediate point to form a generally X-shaped assembly. Each leg includes a bracket 26A fixedly secured to the leg adjacent the upper end of the leg, and a foot 28B fixedly secured to the lower end of the leg. The top end 30A of each strut 30 is pivotably connected to a bracket 26A of an associated leg. The lower end 30B of each strut is pivotably connected to a foot 26B of an associated leg. The legs and struts are collapsible from the extended position shown in FIGS. 1-3, to the compact or collapsed state shown in FIG. 9, and vice versa.

As can be seen in FIGS. 1-3 when the legs are in the extended position they are pivoted with respect to one another about their respective brackets 26A so that they are in an outwardly splayed orientation. This provides good stability for the device 20 when it is used to support the infant either directly in the basket, like shown in FIG. 3, or the infant in the carrier in the basket (not shown). When the legs are in their collapsed state, the basket is also in its collapsed state so the device 20 can be readily stored and/or transported in a compact condition until it is ready for use.

As best seen in FIG. 1, the cross braces 28 on each side of the device 20 include a foldable locking bar 32 located above their central pivot point. The locking bar 32 when extended, i.e., unfolded, like shown in FIG. 1 and, holds its associated cross brace 28 in the extended position. The locking bar is foldable from its extended state to a folded state, so that the associated cross brace can be collapsed to its collapse state, like shown in FIG. 9.

Each leg 26 includes an upper extending portion 26C (FIGS. 5-7) located above the bracket 26A. Each extending portion 26C forms the corner of a frame making up the basket 22. The basket 22 basically comprises plural walls and the frame formed by the extending portions 26C of the legs 26. In particular, the basket's walls are made up of a bottom wall 34, a first side wall 36, a second side wall 38, a first end wall 40 and a second end wall 42. All of those walls are preferably formed of a web of flexible material, e.g., nylon.

The bottom wall 34 is of generally square shape. The two side walls 36 and 38 are of generally rectangular shape, with their height being less than their length. In the exemplary embodiment shown the two side walls are each 7.5 in. high by 16.5 in. long. The end wall 40 is also of rectangular shape and is significantly shorter in height than the side walls 36 and 38, i.e., the end wall 40 is approximately 2.25 in. high. The end wall 40 is connected to one end of the side wall 36 and to the corresponding end of the other side wall 38 and to one end of the bottom wall 34. The end wall 40 forms the front wall of the device 20 when the device is configured to hold the infant carrier 10 in the basket 22 and forms the rear wall of the device when the device is configured to hold a seated infant 12 directly in the basket. The end wall 42 is also of rectangular shape, but is in the form of a somewhat narrow band or web connected to the opposite end of the side wall 36 to which the end wall 42 and to the corresponding end of the other side wall 38. The band forming the end wall 42 is connected to the side walls 36 and 38 adjacent their top edges, thereby leaving an open window 44 located below the end wall 42 contiguous with the bottom wall 34. This window serves to receive the legs of the infant when the infant is seated in the basket 22 as shown in FIG. 4, and as will be described later. In the exemplary embodiment the height of the window 44 is 5.0 in.

As best seen in FIG. 5, the side wall 36 includes an elongated hollow pocket at the intersection of that side wall with the end wall. The pocket receives the extending portion 26C of one of the legs 26, whereupon that extending portion is located at one corner of the basket and is hidden from view. In a similar manner the side wall 38 includes an elongated hollow pocket at the intersection of that side wall with the end wall 40. That pocket receives the extending portion 26C of another one of the legs 26, whereupon that extending portion is located at another corner of the basket and is hidden from view. The side wall 36 includes an elongated hollow pocket at the intersection of that side wall with the end wall 42. The pocket receives the extending portion 26C of another one of the legs 26, whereupon that extending portion is located at another corner of the basket and is hidden from view. In a similar manner the side wall 38 includes an elongated hollow pocket at the intersection of that side wall with the end wall 42. That pocket receives the extending portion 26C of still another one of the legs 26, whereupon that extending portion is located at still another corner of the basket and is hidden from view.

The basket also includes a back support panel 46 which when in its operative state (which will be described later) serves to support the infant's back when the infant is seated in the basket. The back support panel 46 also a flexible member, preferably formed of the same material as that forming the walls 34, 36, 38, 40 and 42 of the basket but being double layered and including internal reinforcement. The back support panel is of rectangular shape and of a width just slightly less than the distance between the two sidewalls 36 and 38 and is of the same height as the sidewalls, although it could be of a greater height or a lesser height, if desired. The bottom of the back support is secured to the bottom wall, e.g., is sewn thereto. The back support panel is configured to be moved or pivoted from a storage position to an operative position, and vice versa. When in the storage position the back support panel is disposed on and generally parallel to the bottom wall 34. When in the operative position, the back support panel extends upward, e.g., approximately perpendicularly, to the bottom wall.

Figure 8:
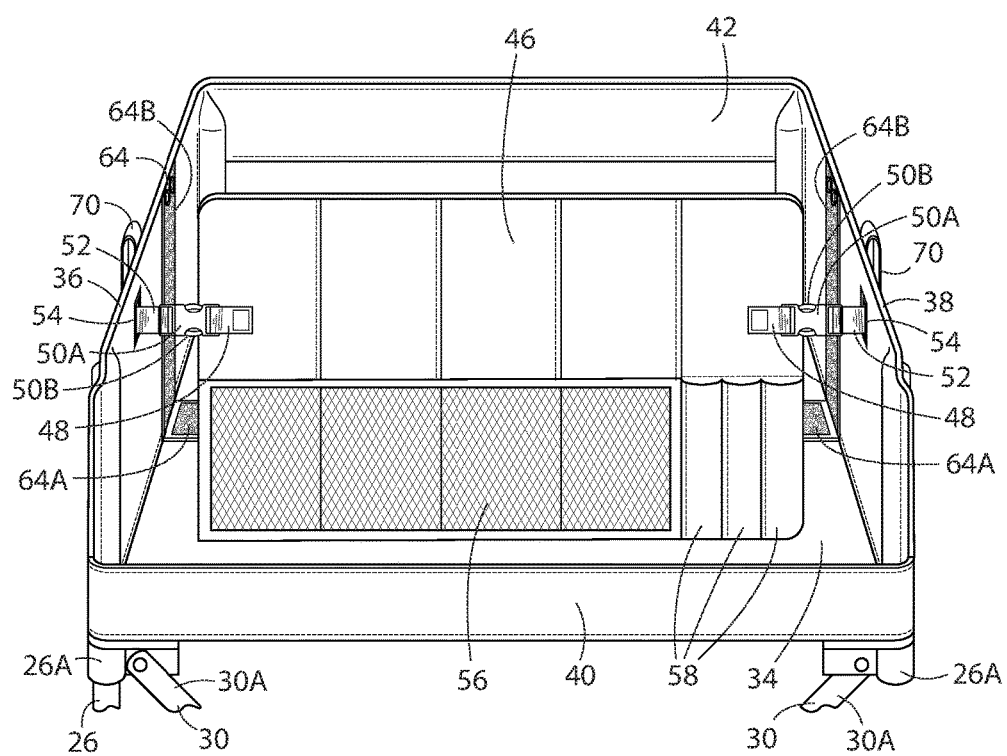
FIG. 8 is an enlarged rear perspective view of a portion of the device of FIG. 1 with the basket configured as a high chair for an infant.

As best seen in FIG. 8, the back support panel 46 includes a pair of flexible straps 48 fixedly secured, e.g., sewn, closely adjacent respective sides of the back support panel adjacent the top of the back support panel. Each strap 48 is a flexible member formed of any suitable strong material, e.g., nylon webbing, and includes one component, e.g., a female component, 50A of a snap connecting buckle or clasp fixedly secured to the free end thereof. The snap connector component 50A is configured to be snap connected to a cooperating, e.g., male, component 50B of the buckle or clasp when the back support panel is pivoted upward to its operative state. Each cooperating component 50B is slidably secured adjacent the free end of a respective flexible strap 52. Each strap 52 is a flexible member formed of any suitable strong material, e.g., nylon webbing, and is connected to a respective one of the sidewalls 36 and 38. In particular, one of the straps 52 is fixedly secured, e.g., sewn, to the outer surface of the sidewall 36 adjacent the top edge thereof, while the other of the straps 52 is fixedly secured, e.g., sewn, to the outer surface of the sidewall 38 (FIG. 5) adjacent the top edge thereof.

The sidewall 36 includes a vertically oriented slit or slot 54 located between the point at which the strap 52 is fixedly secured thereto and the end wall 40. The slit or slot 54 is arranged to have the free end of the strap 52 on the sidewall 36 extended through it so that the snap connector component 50B is located within the basket. When extended through the slit or slot the snap connector component 50B of the strap 52 can be releasably snap connected to the snap connector component 50A that is on the free end of the strap 48 secured to the portion of the back support panel 46 adjacent the sidewall 36, when the back support panel is pivoted upward. In a similar manner, the sidewall 38 also includes a vertically oriented slit or slot 54 located between the point at which its strap 52 is fixedly secured thereto and the end wall 40. The slit or slot 54 of the sidewall 38 is arranged to have the free end of the strap 52 on that sidewall extended through it so that the snap connector component 50B is located within the basket. When extended through the slit or slot the snap connector component 50B of the strap 52 of the sidewall 38 can be snap connected to the snap connector component 50A that is on the free end of the strap 48 connected to the portion of the back support panel adjacent the sidewall 38.

As will be appreciated by those skilled in the art, the snap connection of the components 50A and 50B as just described releasably secures the back support panel in its operative or upright orientation so that it is available to receive the back of the infant when the infant is seated on the bottom wall 34 in the basket 22. As mentioned earlier each connector component 50B is slidably mounted on its associated strap 52. Thus, the position of the connector component 50B on the strap can be adjusted as desired and then fixed in place as is conventional with such conventional buckles or clasps. The positioning of the connector component 50B on its strap enables one to adjust the angle of the back support panel 46 to the bottom wall. For example, when the connectors 50B are located on their respective straps so that they are closer to the end of their straps compared to when they are located to hold the back support panel vertical, the back support panel will extend at an obtuse angle with respect to the bottom wall, whereby the infant's back will be supported in a somewhat reclining position. Moreover, the flexible nature of the back support panel will result in some "give" so that the central portion of the back support panel will bend somewhat when the infant is seated against it. Since the back support panel is arranged to support the back of the infant, as mentioned earlier it is reinforced.

As best seen in FIG. 8 the back support panel 46 preferably includes a mesh pocket 56 for holding various items in it, as well as plural elongated pockets 58 for receipt of other items, e.g., a pen or pencils, etc.

It should be pointed out at this juncture that the releasable securement of the back support panel 46 in its operative position can be achieved by other means than the adjustable strap-mounted snap connectors 50A and 50B. Thus, any other suitable releasably securable means can be used to releasably secure the back support panel in its operative orientation or state.

Figure 6:
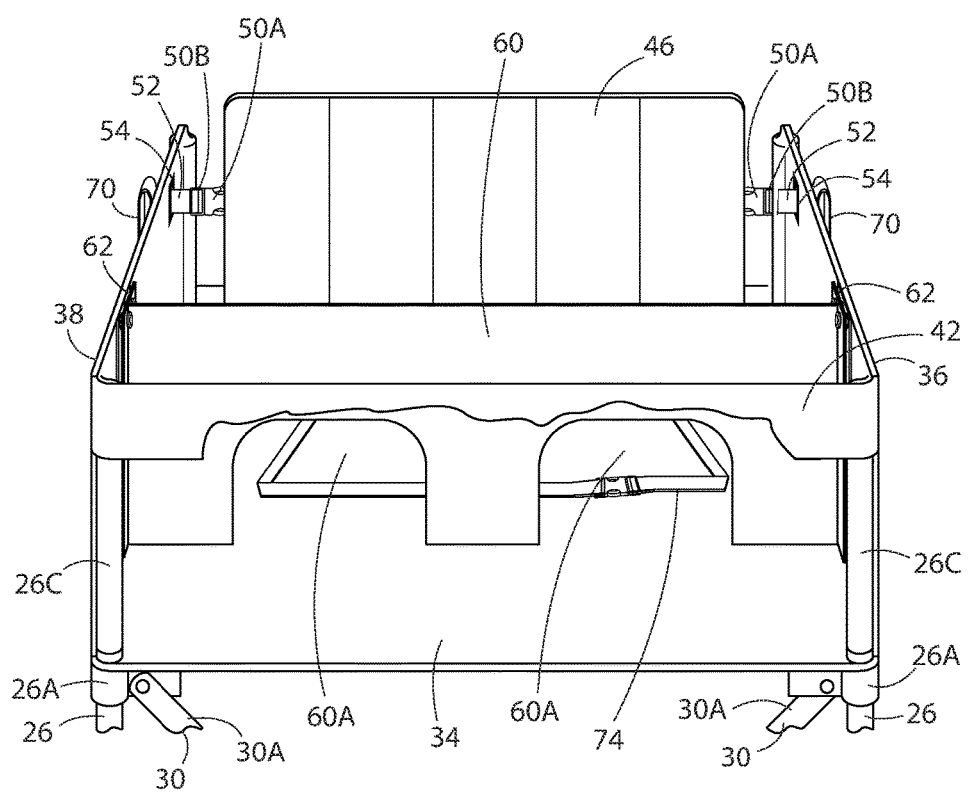
FIG. 6 is an enlarged front perspective view of a portion of the device of FIG. 1 with the basket configured as a high chair for an infant.
Figure 7:
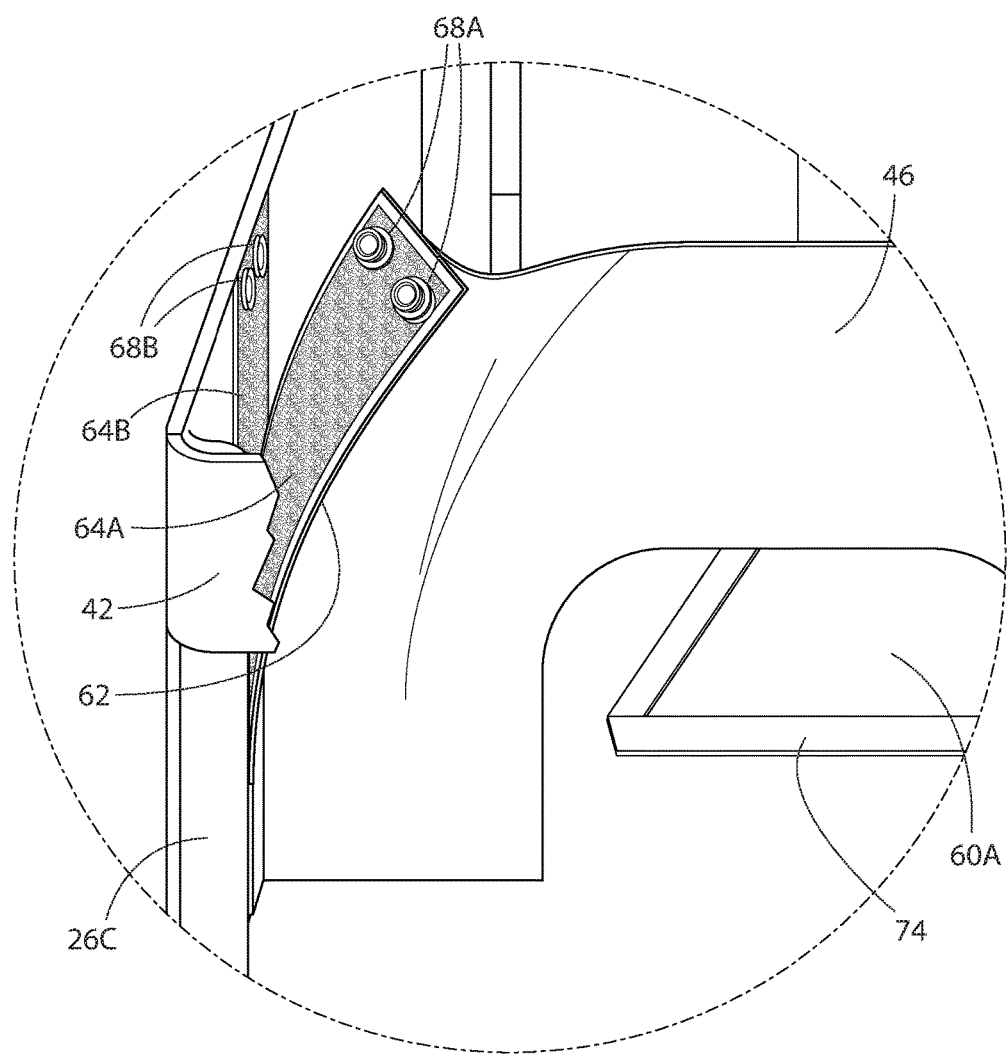
FIG. 7 is an enlarged perspective view of a portion of the device shown in FIG. 6.

The basket 22 also includes a crotch panel 60. The construction of the crotch panel 60 and its location with respect to the bottom wall of the basket are quite important in the interest of safety, as will be described later. The crotch panel is best seen in FIGS. 5-7, and is also a flexible member, preferably formed of the same material as that forming the walls 34-42 of the basket. The crotch panel is of rectangular shape, having a width just slightly less than the distance between the two sidewalls 36 and 38, but whose height is the same as the height of those sidewalls. The bottom of the crotch panel is secured, e.g., sewn, to the bottom wall 34 of the basket and is configured to be moved or pivoted from a storage position to an operative position and vice versa. When in the storage position the crotch panel 60 disposed on and generally parallel to the bottom wall 34. When in the operative position, the crotch panel 60 extends upward, e.g., approximately perpendicularly, to the bottom wall. The crotch panel includes a pair of leg openings 60A, each equidistantly spaced from the center of the crotch panel and located immediately adjacent the bottom wall 34. Each of the leg openings 60A is arranged to receive a respective leg of the infant when the infant is seated on the bottom wall 34 in the basket with his/her back against the back support panel 46 when the back support panel is in the operative position. Thus, the infant's crotch region will be located adjacent the crotch panel to hold the infant in place generally centered within the basket, with the crotch panel serving as a barrier prevent the infant from sliding out of the basket.

In order to hold the crotch panel 60 in its operative or upright orientation, the crotch panel includes releasably securable connector components on each of its sides. In particular, a flanged extension strip 62 is located on the side of the crotch panel adjacent the sidewall 36 and a similar flanged extension strip 62 is located on the side of the crotch panel adjacent the sidewall 38. Each flanged extension strip is formed of a flexible material, e.g., the same material as that forming the walls 34-42. The outer surface of each flanged extension strip is in the form of one component of a two component multi-hook and multi-loop fastener, like a VELCRO® fastener. In particular, the multi-loop or plush component 64A of one fastener is fixedly secured to the outer surface of the flanged extension strip 62 that is located adjacent the sidewall 36. In a similar manner the multi-loop or plush component 64A of the other fastener is fixedly secured to the outer surface of the flanged extension strip 62 that is located adjacent the sidewall 38. An elongated strip of the multi-hook component 64B of the one fastener is fixedly secured, e.g., sewn or adhesively secured, onto the inner surface of the sidewall 36 aligned with the position at which the crotch panel is secured to the bottom wall. The strip of the multi-hook component extends vertically for substantially the full height of the sidewall 36. In a similar manner an elongated strip of the multi-hook component 64B of the other fastener is fixedly secured, e.g., sewn or adhesively secured, onto the inner surface of the sidewall 38 aligned with the position at which the crotch panel is secured to the bottom wall.

When the crotch panel 60 is moved or pivoted upward to its vertically upright orientation the multi-loop component 64A on the side of the crotch panel adjacent the sidewall 36 can be releasably secured to the multi-hook component 64B on the sidewall 36 and the multi-loop component 64A on the side of the crotch panel adjacent the sidewall 38 can be releasably secured to the multi-hook component 64B on that sidewall, thereby releasably securing the crotch panel in its operative state.

In the exemplary embodiment of the invention shown herein additional releasably securable fastening means are provided to hold the crotch panel in its operative state. In particular, that additional means comprises two pair of snap connectors. One pair of male components 68A of conventional snap connectors is secured to the flanged extension 62 at the top portion thereof on the side of the crotch panel adjacent the sidewall 36 so that each male connector 68A extends outward toward the sidewall 36. In a similar manner, another pair of male components 68A is secured to the flanged extension 62 at the top portion thereof on the side of the crotch panel adjacent the sidewall 38 so that each male connector 68A extends outward toward the sidewall 38. A pair of female snap connectors 68B is mounted on the sidewall 36 adjacent the top edge thereof at the location of the strip of the multi-hook component 64B so that the male snap connectors 68A can be snap fit in the female snap connectors 68B when the crotch panel is in its operative state. Similarly, a pair of female snap connectors 68B is mounted on the sidewall 38 adjacent the top edge thereof at the location of the strip of the multi-hook component 64B so that the male snap connectors 68A can be snap fit in the female snap connectors 68B when the crotch panel is in its operative state.

Operation of the device 20 to support an infant carrier in the basket 22, is as follows, it being understood that an infant 12 would be located within the carrier 10, although the infant isn't shown in the carrier in FIGS. 1 and 2. To that end, the legs 26 of the device are pulled outward from one another to configure the device from its compact or collapsed state shown in FIG. 9 to its operative state shown in FIG. 3. The extension of the legs of the base 24 to their operative, splayed out position also opens the basket 24 such that its sidewalls 36 and 38 and the end walls 40 and 42 extend perpendicularly upward from the now planar bottom wall. In that open state the back support panel 46 and the crotch panel 60 of the basket 22 will be folded or pivoted down in their storage position, i.e., they are generally parallel with the bottom wall 34 of the basket. Thus, the basket will be hollow and ready for receipt of the infant carrier 10. The infant carrier, with or without an infant in it at that time, can then be disposed within the hollow basket by placing the back of the carrier against the inner surface of the end wall 42, such as shown in FIG. 1, wherein the front of the carrier engages the low height end wall 40.

In order to secure the infant carrier and the infant within the infant carrier in place in the basket 22, the basket 22 includes a pair of flexible straps 70. Each strap is formed of any suitable flexible strong material, e.g., nylon webbing. One end of one strap 70 is fixedly secured, e.g., sewn, to the sidewall 36 at the top edge of that sidewall. The corresponding end of the other strap 70 is fixedly secured, e.g., sewn, to the sidewall 38 at the top edge of that sidewall. The free end of one of the straps 70 has one connector, e.g., a female component, 72A of a snap connecting buckle or clasp fixedly secured to the free end thereof, while the free end of the other of the straps 70 has the other component, e.g., the male, component 72B of the buckle or clasp slidably secured on the free end portion of that strap. As such one can adjust the length of the strap 70 to which the buckle component 72B is connected to a desired length so that when the buckle or clasp components 72A and 72B are releasably connected together the straps 70 serve to tightly hold the infant carrier and the infant within the basket.

When it is desired to convert the device from its infant carrier stand configuration such as shown in FIG. 1 to its highchair configuration directly supporting the infant on the bottom wall in the basket, such as shown in FIG. 4, all that is required is to unbuckle the buckle components 72A and 27B, thereby freeing the infant carrier so that it can be lifted out of the basket. Once the infant carrier is free of the basket the straps 52 can be extended through the slots 54 in the sidewalls 36 and 38 so that their buckle components 50B are within the basket. The back support panel can then be moved or pivoted from its stowed position, like shown in FIG. 3, to its operative position by pulling upward on it. When in the desired position the buckle connector components 50A secured to the back support panel can be releasably snap fit into the buckle components 50B, whereupon the back support panel will be held in that upright operative position. If necessary the positioning of the buckle components 50B on their respective straps 52 can be adjusted to establish a desired angular orientation of the back support panel.

The crotch panel 60 can be moved to its upright position and secured in place by pulling upward on it so that it is vertically oriented, whereupon the multi-loop component 64A on the side of the crotch panel adjacent the sidewall 36 can be releasably secured to the multi-hook component 64B on the sidewall 36 and the multi-loop component 64A on the side of the crotch panel adjacent the sidewall 38 can be releasably secured to the multi-hook component 64B on that sidewall. In addition, the male snap connectors 68A on the side of the crotch panel adjacent the sidewall 36 can be snap fit in the female snap connectors 68B on the sidewall 36 and the male snap connectors 68A on the side of the crotch panel adjacent the sidewall 38 can be snap fit in the female snap connectors 68B on that sidewall, thereby completing the releasable securement of the crotch panel in its vertically oriented operative state.

Once the back support panel and the crotch panel are in their desired operative positions the infant can be placed in the basket so that his/her rump rests on the bottom wall 34, with his/her back is against the back support panel and with his/her legs extending through respective leg openings 60A in the crotch panel and through the window 44 in the end wall 42.

As should be appreciated by those skilled in the art, since the crotch panel 60 is located near the middle of the basket, when the infant is seated in the basket as described above he/she will be generally centered in the device, thereby reducing the chance of the device tipping over. Moreover, the outwardly splayed nature of the legs of the base when expanded to their operative position also serves to reduce, if not eliminate, the chance of the device tipping over. Thus, the subject invention offers a safety advantage over the prior art, all the while providing a device which is somewhat simple in construction, easy to use, and easy to collapse for storage or transportation.

Without further elaboration the foregoing will so fully illustrate our invention that others may, by applying current or future knowledge, adopt the same for use under various conditions of service.

We claim:

1. A convertible high chair and infant carrier stand device, said device comprising:

a basket section comprising a bottom wall, a first end wall, a pair of sidewalls, and a second end wall, each of said walls comprises a flexible material, said first end wall being of a lesser height than said sidewalls, said basket section being configurable to receive an infant carrier which has a front and a rear, wherein the front of the infant carrier is disposed immediately adjacent said first end wall and the rear of the infant carrier is disposed immediately adjacent said second end wall, said second end wall having a window located closely adjacent said bottom wall, said basket section also being configurable to hold a seated infant therein and additionally comprises a back support panel and a crotch panel, said back support panel being connected to said bottom wall between said first end wall and said second end wall, said back support panel being configured to be moved from a storage position to an operative position, and vice versa, said back support panel, when in said storage position, being generally parallel to said bottom wall and when in said operative position extending upward from said bottom wall, said back support panel having a pair of edge portions configured for releasable securement to respective ones of said sidewalls to hold said back support panel in said operative position to engage the back of an infant seated on said bottom wall in said basket, said crotch panel being a flexible member having a pair of side edge portions and a pair of leg openings spaced laterally inward of said side edge portions and defining a central portion therebetween, said crotch panel being located between said back support panel and said second end wall, with said central portion being secured to said bottom wall and with portions of said crotch panel adjacent said side edge portions being secured to said bottom wall, said crotch panel being configured to be pivoted from a storage position to an operative position, and vice versa, said crotch panel, when in said storage position, being generally planar and disposed parallel to said bottom wall, said crotch panel when in said operative position being generally planar and extending upward from said bottom wall, said side edge portions of said crotch panel being configured for direct releasable securement to said sidewalls to hold said crotch panel in said operative position with said side edge portions abutting respective ones of said sidewalls to securely hold said crotch panel in said operative position, whereupon said leg openings are oriented to receive respective legs of an infant seated on said bottom wall in said basket section with the legs of the infant extending through said window so that the infant is generally centered and held securely within the basket; and a base supporting said basket section on said base.

2. The device of claim 1, wherein said base comprises plural legs coupled to said basket, said legs being configured to be pivoted with respect to one another from an outwardly splayed orientation to an inwardly compact position, and vice versa.

3. The device of claim 2, wherein each of said walls is configured to be collapsed when said legs are in said inwardly compact position.

4. The device of claim 1, wherein when said crotch panel is in said operative position it extends generally perpendicular to said base wall.

5. The device of claim 1, wherein each of said edge portions of said crotch panel comprises a first connector and wherein each of said side walls comprises a second connector, said first connector of a first one of said edge portions of said crotch panel being configured for releasable securement to said second connector of a first one of said sidewalls, said first connector of a second one of said edge portions of said crotch panel being configured for releasable securement to said second connector of a second one of said sidewalls.

6. The device of claim 5, wherein said first connector comprises one component of a two component fasting system and the second connector comprises a second component of said two component fastening system, said two component fastening system comprising a multi-hook component and a multi-loop component.

7. The device of claim 6, additionally comprising snap connectors for releasably securing said edge portions of said crotch panel to said sidewalls.

8. The device of claim 6 wherein each of said sidewalls includes a top edge and wherein said snap connectors are located adjacent said top edge.

9. The device of claim 1 additionally comprising a strap for releasably securing the infant carrier to said basket section.

10. The device of claim 3, wherein each of said edge portions of said crotch panel comprises a first connector and wherein each of said side walls comprises a second connector, said first connector of a first one of said edge portions of said crotch panel being configured for releasable securement to said second connector of a first one of said sidewalls, said first connector of a second one of said edge portions of said crotch panel being configured for releasable securement to said second connector of a second one of said sidewalls.

11. The device of claim 10, wherein said first connector comprises one component of a two component fasting system and the second connector comprises a second component of said two component fastening system, said two component fastening system comprising a multi-hook component and a multi-loop component.

12. The device of claim 11, additionally comprising snap connectors for releasably securing said edge portions of said crotch panel to said sidewalls.

13. The device of claim 12 wherein each of said sidewalls includes a top edge and wherein said snap connectors are located adjacent said top edge.

14. The device of claim 10 additionally comprising a strap for releasably securing the infant carrier to said basket section.

15. The device of claim 1 wherein each of said sidewalls has an outer surface, and wherein said back support panel comprises a pair of flexible straps extending therefrom, each of said flexible straps of said back support panel having a buckle or clasp component secured thereon, each of said straps being configured to be extended through an associated sidewall of said basket for releasable securement to a buckle or clasp component secured to said outer surface of said sidewall to hold said back support panel in said operative position.

16. The device of claim 5 wherein each of said sidewalls has an outer surface, and wherein said back support panel comprises a pair of flexible straps extending therefrom, each of said flexible straps of said back support panel having a buckle or clasp component secured thereon, each of said straps being configured to be extended through an associated sidewall of said basket for releasable securement to a buckle or clasp component secured to said outer surface of said sidewall to hold said back support panel in said operative position.

17. The device of claim 1 additionally comprising a harness secured to said basket to hold a seated infant in said basket.

18. The device of claim 17 wherein said harness secured to said bottom wall.

\* \* \* \* \*